United States Patent [19]

Espy

[11] 4,120,282
[45] Oct. 17, 1978

[54] SOLAR RADIATION REFLECTOR AND COLLECTOR ARRAY

[76] Inventor: Patrick N. Espy, 10,008 Hickory Hill La. SE., Huntsville, Ala. 35803

[21] Appl. No.: 791,731

[22] Filed: Apr. 28, 1977

[51] Int. Cl.² .............................................. F24J 3/02
[52] U.S. Cl. .................................. 126/270; 126/271; 237/1 A
[58] Field of Search ................ 126/270, 271; 236/1 A

[56] References Cited

U.S. PATENT DOCUMENTS

| | | | |
|---|---|---|---|
| 3,868,823 | 3/1975 | Russell, Jr. et al. | 126/271 |
| 4,020,827 | 5/1977 | Broberg | 126/271 |

Primary Examiner—Kenneth W. Sprague
Attorney, Agent, or Firm—Isaac P. Espy

[57] ABSTRACT

The invention relates generally to a novel arrangement of fixed flat plate solar reflectors and collectors whereby an increased efficiency is obtained during year-long use.

6 Claims, 12 Drawing Figures

FIG. 1

STANDARD GEOMETRY
(LATITUDE = 30°)

FIG. 2

ESPY GEOMETRY
(LATITUDE = 30° OR LESS)

FIG. 3

ESPY GEOMETRY
(LATITUDE 30° TO 32.5°)

FIG. 4

ESPY GEOMETRY
(LATITUDE ABOVE 32.5°)

FIG. 5

COMPARATIVE INCIDENT SOLAR FLUX

FIG. 6

COMPARATIVE COLLECTOR EFFICIENCY

FIG. 7

ESPY GEOMETRY

COMPARATIVE INCIDENT AND COLLECTED
ENERGY RATES (JUNE)

FIG. 8

STANDARD GEOMETRY

COMPARATIVE INCIDENT AND COLLECTED
ENERGY RATES (JUNE)

FIG. 9

COMPARATIVE ENERGY COLLECTIONS

FIG. 10

RELATIVE INDICENT FLUX, COLLECTOR EFFICIENCY, AND COLLECTED ENERGY

FIG. 11

TYPICAL COLLECTOR PERFORMANCE CURVES

FIG. 12

SOLAR RADIATION REFLECTOR AND COLLECTOR ARRAY

BRIEF BACKGROUND AND SUMMARY OF THE INVENTION

The art of collection and conversion of solar radiation into directly usable sources of energy is well known. Practical demonstrations have been effected with increasing frequency. However, amortization of the initial costs of the devices required have made widespread application uneconomical. The instant invention relates to a more efficient solar radiation collector, a principal component of any solar energy conversion system.

Highly efficient collectors could be made, of economical construction, if the radiation source and the radiation collector remained in a fixed positional relationship. However, the rotation of the earth on its own axis creates a constant daily movement of the collector with respect to the sun's rays, and the rotation of the earth around the sun causes an annual movement of the collector with respect to the sun's rays equivalent to twice the angle of inclination (about 23° 30') of the earth's axis from an axis perpendicular to the earth's orbit (ecliptic) around the sun. Thus, a fixed collector receives the sun's rays at continuously changing angles as a function of the time of day and day of the year. Collectors tilted so as to be perpendicular in plane to the sun's rays at noon on summer solstice, would have a plane 47° off of a perpendicular to the sun's rays at noon on winter solstice.

A variety of means to overcome this initial problem in utilizing solar radiation have been devised. One basic approach has been to mechanically move the solar collector or solar reflector to "track" the sun, so that a maximum amount of the radiation flux incident upon the system would be utilized. Drescher (U.S. Pat. No. 3,171,403 in 1965) taught a solar heating system requiring a mechanical tracking means. See also U.S. Pat. Nos. Phelps (2,969,918 in 1961), Falbel (3,841,302 in 1974), Blake (3,892,433 in 1975), Jahn (3,905,352 in 1975), Anderson (3,924,604 in 1975), and Barber (3,980,071 in 1976). Northrup (3,991,741 in 1976) taught the use of directional optics with moving absorbers following the changing focal points of received radiation. Also teaching use of optics was Fletcher, et al. (U.S. Pat. No. 3,915,148 in 1975), using Fresnel lenses which were fixed. Edlin (U.S. Pat. No. 3,058,394 in 1962) taught a fixed array of light reflective surfaces of a parabolic profile, having a collector at the focal region of the various parabolas. The principal objection to the solutions outlined above is the complexity of the devices required and attendant high cost. Illustrative is the invention of Davis (U.S. Pat. No. 3,957,030 in 1976), which would be highly adaptable to space craft, where economy is not necessarily of high priority. Falbel (U.S. Pat. No. 3,923,039 in 1975) taught a fixed, scoop-shaped device, particularly useful in vertical surfaces.

Another problem encountered in the conversion of solar radiation is the relatively low temperatures at which the absorbing collector transfers the radiated energy by conduction to the heat transfer liquid. The production of temperatures required for refrigeration or space cooling systems by the absorption process can be accomplished only very inefficiently by the absorption of solar flux at atmospheric concentration. Therefore, to be effective the amount of flux incident upon a system must be concentrated to increase heat transfer temperature differences and reduce the convection heat loss of the collectors. The solution of the requirement for flux concentration closely parallels the solution to the sun tracking requirement, and some of the solutions are included in the prior art cited above. The prior art solutions are generally characterized by sophisticated and expensive optics or reflectors of complex curvature.

The present invention overcomes much of the difficulty previously experienced by selectedly positioning simple rectangularly shaped planar reflectors and rectangularly shaped planar collectors. Both the reflector and collector materials are well known and have been used in solar energy technology; however, their use has been at an efficiency generally not great enough to allow the use of solar radiation for refrigeration or space cooling. In prior art, a simple array has been used whereby the axes of the collectors were oriented in the east and west direction, the collectors tilted from the north-south horizontal. This angle of tilt in a standard geometrical array varied with the latitude of the place where the system was installed so that during the season in which the greatest efficiency was desired, the collector would be in a plane approximately perpendicular to the sun's rays. Instead of having one large panel collector, several narrower ones have been desirable so that there will be a lower profile on roof surfaces where they are normally situated; however, in this preferred array, the southern most panels (in the northern hemisphere) shadowed the northern most panels at winter solstice, or a large unheated gap would be unutilized between panels at other sun positions during the other seasons. Thus, in the most economical collector system, the total solar flux incident upon the system could never be utilized because of compromises in collector height, angle, and spacing which had to be made to make a year-round system of maximum efficiency. Using reflectors between the spaced tilted collectors, the reflectors connecting the northern upper edge (in the northern hemisphere) of one collector with the lower southern edge of the adjacent northerly collector, additional flux can be retained, and to some extent concentrated. However, with flat reflectors just described, flux is still reflected back into the atmosphere during a considerable portion of the year. It should be noted here that solar radiation consists of direct beams from the sun plus diffuse radiation due to refraction and reflection of direct beams by atmospheric and terrestrial interference.

My invention, called the Espy Geometry, consists in the array or arrangement of multiple flat panels of solar radiation collectors, with long axes horizontal in the east-west direction, and the plane of the reflector tilted from the horizontal in the north-south direction. These collector panels are alternately spaced with multiple faceted reflectors comprising two or three planar rectangularly shaped reflectors tilted at angles such that no shadows fall on the system during the mid-day hours at any time during the year, and all of the flux incident upon the system as a whole is directly or indirectly made incident on the collectors. Compared with the use of standard collectors alone, or with single faceted reflectors and collectors, the efficiency of my invention is considerably greater. The increased efficiency, with cheap components, enables the heat transfer liquid to attain temperatures in the range where refrigeration or space cooling can be effected by the use of the absorption process. The arrangement allows total flux utilization in the heating season, with relatively lesser flux concentration, an acceptable situation when the system is used for heating. However, as the season progresses to summer solstice, the flux is collected at greater concentrations for the use of the system in the refrigeration or space cooling mode.

DETAILED DESCRIPTION AND PREFERRED EMBODIMENT OF THE INVENTION

Figure 1:
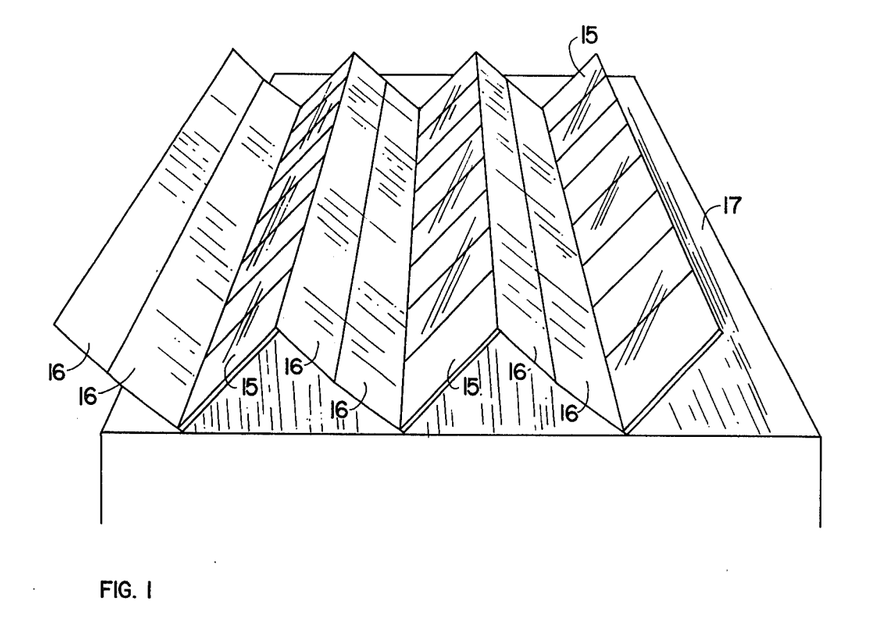
FIG. 1 shows an elevated view of a three tiered set of reflector-collectors mounted upon a flat surface.

Referring first to FIG. 1 of the drawings, there is shown in an elevated perspective view, the preferred embodiment of a collector-reflector array using the Espy Geometry for application in an area of latitude not higher than 30°. Collectors 15 are shown with long axes in the east-west direction, and with the planes of the collectors 15 tilted from the north-south horizontal. Reflectors 16 are shown with long axes in the east-west direction and tilted generally downwardly from the south to the north. (All descriptions in this application refer to north and south for applications in the northern hemisphere. However, the invention is equally applicable for use in the southern hemisphere.) The array is mounted on a horizontal surface 17, generally the flat roof of the building to be served. However, the system may be mounted independent of the spaces to be served and further may be adapted for mounting on sloped surfaces. While the preferred array of the long axes of prior art and the array of the instant invention is along east-west axes, an exact east-west alignment is not necessary. Some degradation of efficiency occurs in slight azimuth changes, but the comparisons recited below are still valid when comparing prior art and this invention on the same azimuth.

Figure 2:
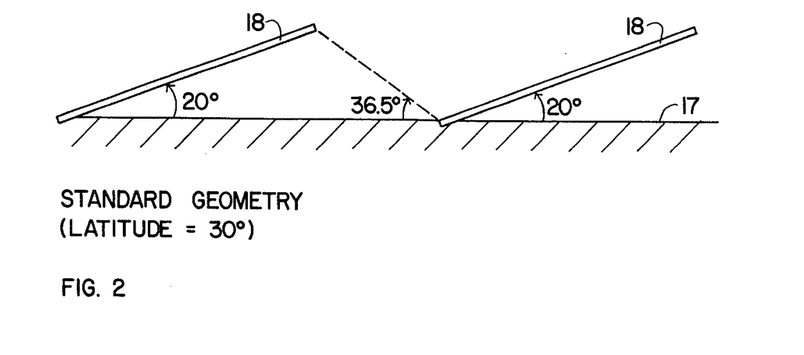
FIG. 2 shows an end view of a prior art array of fixed planar collectors, in this application the Standard Geometry against which the invention is compared.
Figure 3:
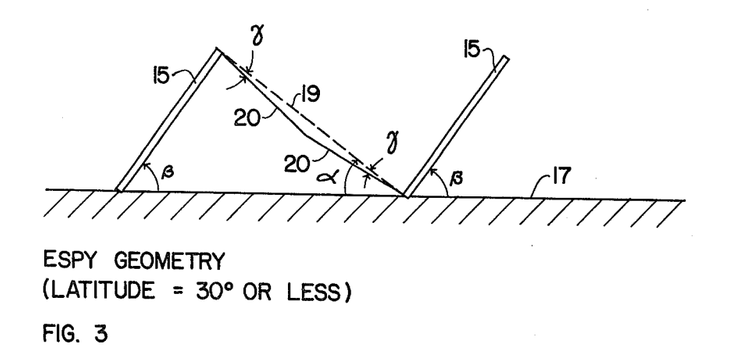
FIG. 3 shows an end view of a reflector-collector system for use below latitude 30°.

Referring now to FIG. 2, an end view of an array typical of prior art is shown, wherein planar collectors 18 are used, generally tilted from the horizontal downwardly toward the equator at an angle of latitude minus 10°. FIG. 3, for the same latitude, shows an end view of an array typical of the Espy Geometry, where the collectors 15 are tilted from the horizontal downwardly toward the equator at an angle $\beta$ equal in value to the latitude of the array plus 23.5°, an angle which will allow the collector plane to be perpendicular to the sun's rays at noon on winter solstice. While this value for $\beta$ is preferred, efficiency is not greatly effected by deviations in this angle. The angle $\alpha$ is the angle of tilt of the reflector aperture 19 from the horizontal downwardly away from the equator, and is equal in value to 66.5° minus the latitude of the array; this being the maximum angle possible still avoiding any shadowing of the collector surface at noon on winter solstice. The "reflector aperture" is defined herein as that single plane whose upper edge is the upper edge of the upper reflector facet, and whose lower edge is the lower edge of the lowest reflector facet. The angle $\alpha$, as defined above is critical, being a function of latitude. The reflector aperture dimension is also critical, being a function of the height of the collector. The collector height, however, is determined principally by practical structural, material, and performance characteristics not critical to this invention. The angle $\gamma$, which is the angle between the reflector facet 20 and the reflector aperture 19, is found by the formula latitude/2 minus 9.75°. This formula is effective from latitudes 19.5° to 30°. Below latitude 19.5°, $\gamma$ would equal 0°, making the reflector a single faceted plane. Using this formula results in the condition where all rays of the sun falling on the reflector are always reflected directly, or indirectly via the other reflector facet, on to the collector; and during the summer season, when high heat transfer liquid temperatures are essential, there is a high degree of solar radiation concentration.

Figure 4:
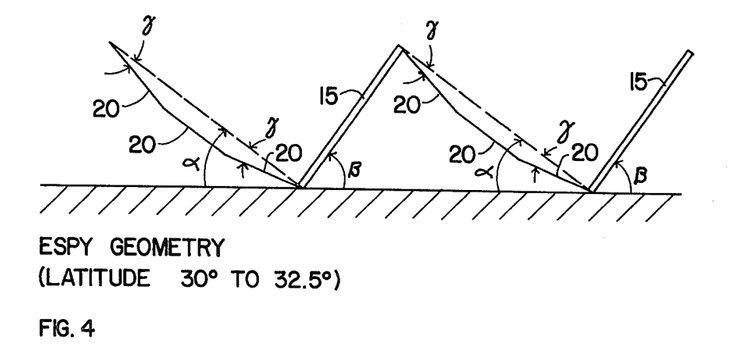
FIG. 4 shows an end view of a reflector-collector system for use at latitude between 30° and 32.5°.
Figure 5:
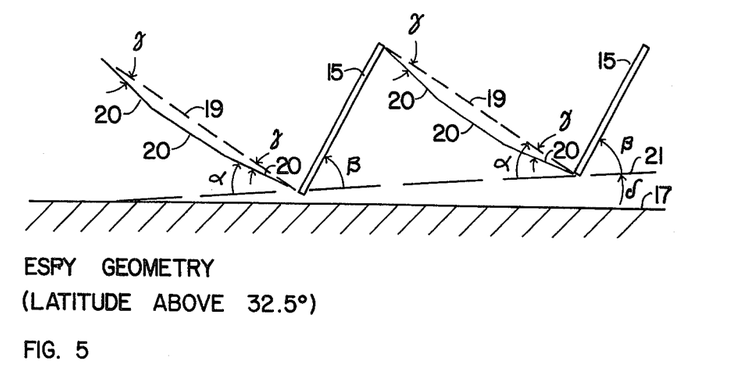
FIG. 5 shows an end view of a reflector-collector system for use at latitudes above 32.5°.

FIG. 4 is illustrative of the Espy Geometry where the latitude of the array is between 30° and 32.5°. The above formulas are still effective, but the reflector surface is made of three reflector facets, the middle facet being parallel to the reflector aperture 19 and equal in length to 0.3 times the reflector aperture 19, the other two reflector facets being of equal length. Above latitude 32.5°, the array geometry is identical to that found by using the formula for latitude 32.5°, each angle being measured from an assumed artificial horizontal plane 21, as shown in FIG. 5. The entire array is then adapted for use at higher latitudes by further tilting the assumed artificial horizontal plane of the entire array upwardly away from the equator by the angle $\delta$. This angle $\delta$ is equal to the value found by latitude of the array minus 32.5°. FIG. 5 shows an end view of an array for latitude 36.5°.

Figure 6:
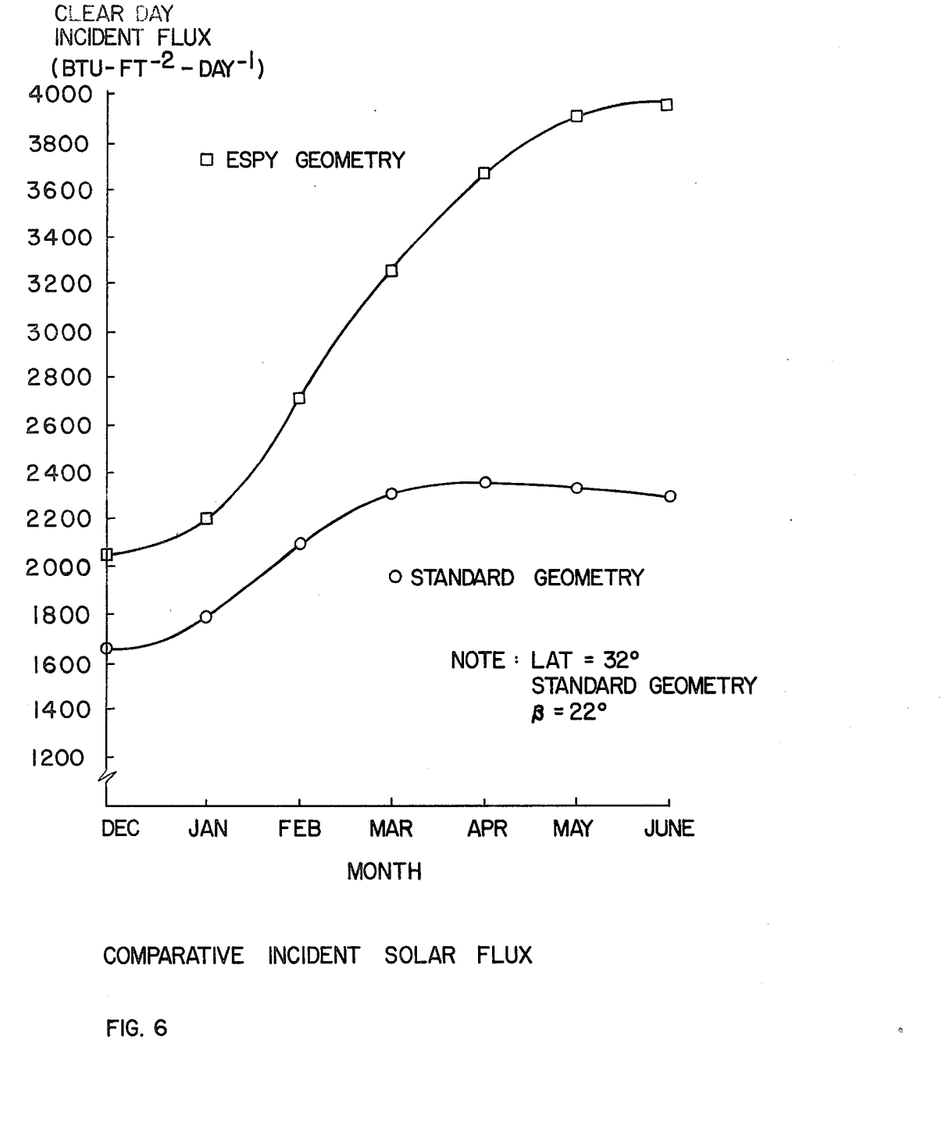
FIG. 6 is a comparative graph of total daily incident solar flux for Standard and Espy Geometry at latitude 32°.
Figure 7:
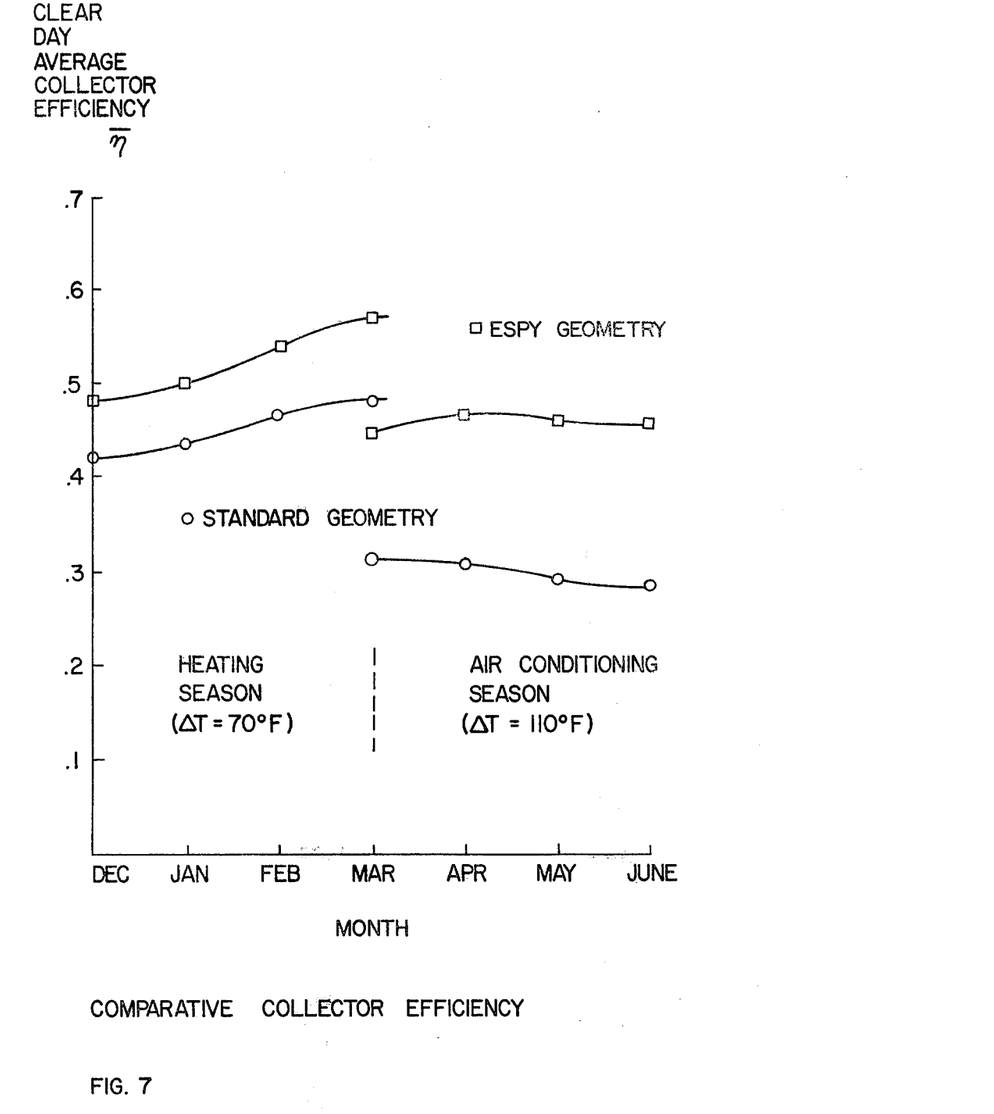
FIG. 7 is a comparative graph of collector total daily efficiency for Standard and Espy Geometry at latitude 32°.
Figure 8:
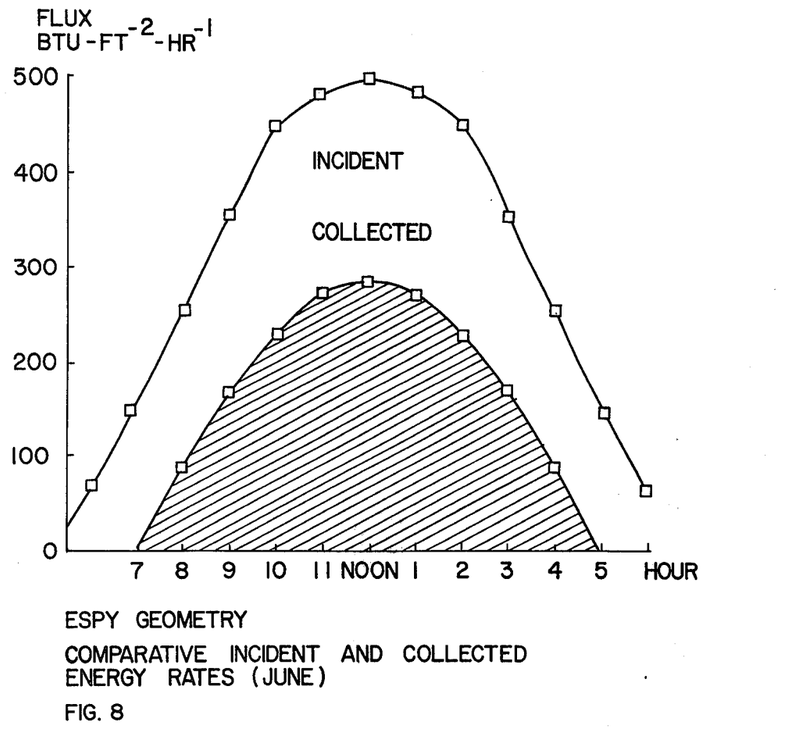
FIG. 8 is a comparative graph of incident and collected energy rates on a collector-reflector of Espy Geometry at latitude 32° on summer solstice.
Figure 9:
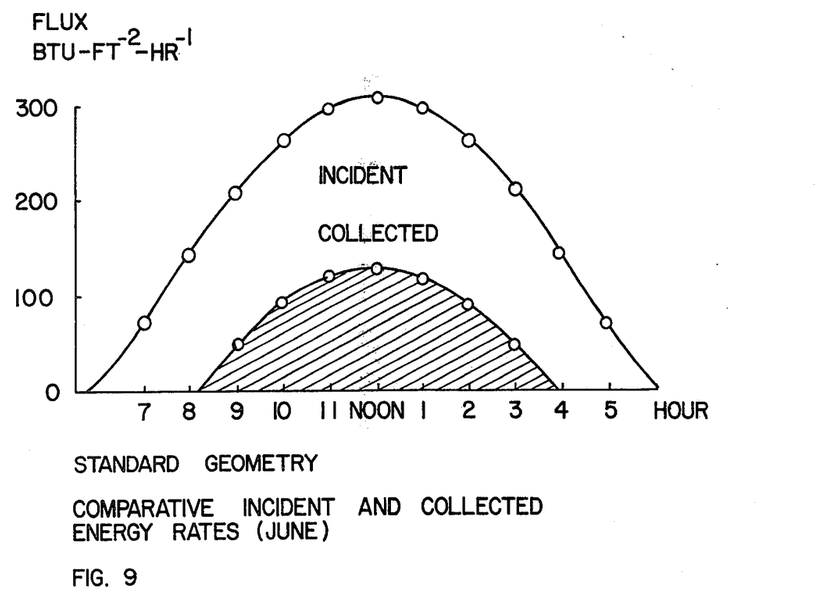
FIG. 9 is a comparative graph of incident and collected energy rates on a collector-reflector of Standard Geometry at latitude 32° on summer solstice.
Figure 10:
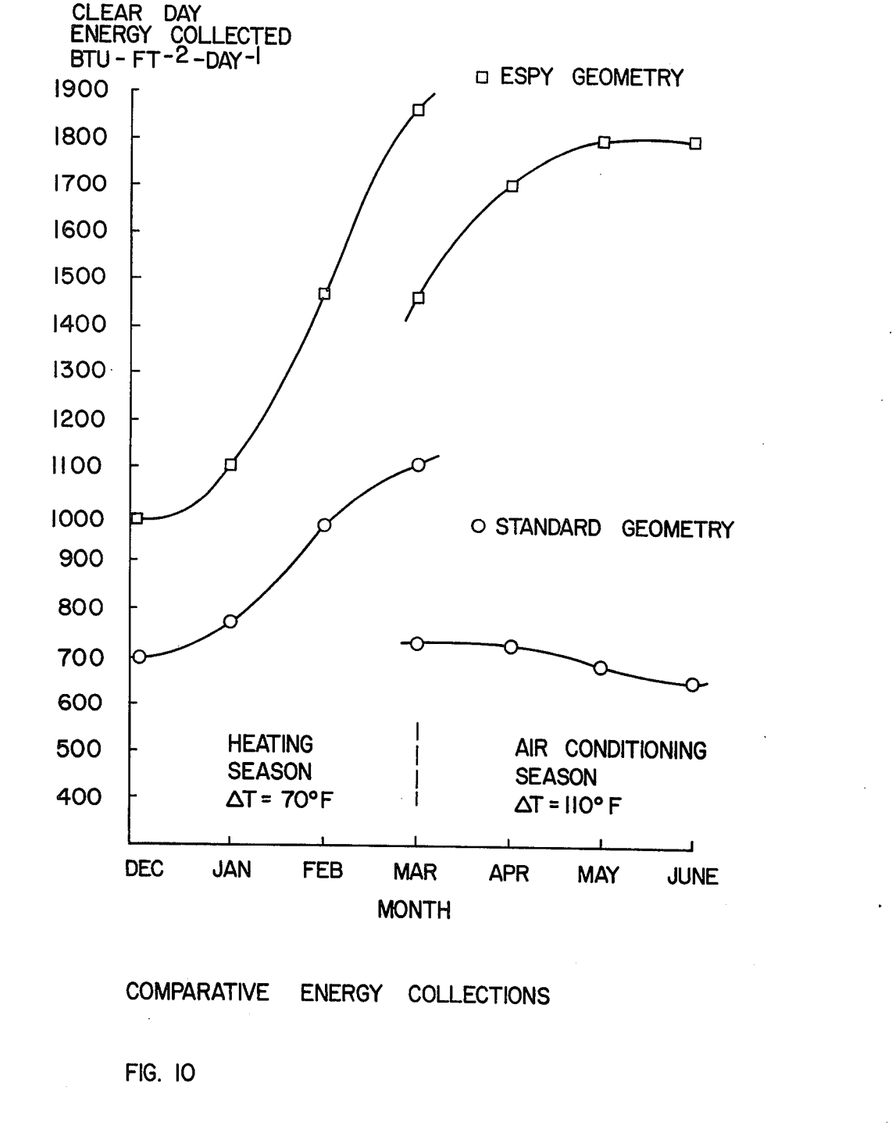
FIG. 10 is a comparative graph of daily energy collections for Standard and Espy Geometry.

FIG. 6 shows a comparison graph of total daily incident solar flux for a typical Standard Geometry array for latitude 32°; that is, collector panels tilted at 22° for no shading at winter solstice, and for the same condition, the values found by using Espy Geometry. An increase in total daily incident flux is noted from about 25% to about 70%. FIG. 7 is a comparative graph of collector total daily efficiency for the same two arrays under the same conditions, using an efficiency formula $\eta = 0.82 - 1.1233 [(\Delta T/i)]$, where $\Delta T$ is the difference between collector input fluid temperature and ambient temperature, in degrees Fahrenheit, and i is the incident solar flux in Btu per square foot per hour. The constants in the formula are derived from values previously known in the art. For the heating season, ΔT is taken as 70°, and for the air conditioning season, ΔT is taken as 110°, both values being typical of actual empirical data. The value for $i$ is computer derived from known beam and diffuse radiation values available from the *ASHRAE Handbook of Fundamentals,* a publication of the American Society of Heating, Refrigeration, and Air Conditioning Engineers. The improvement in efficiency is apparent. FIGS. 8 and 9 are comparative graphs of incident and collected energy rates on the above described Standard and Espy Geometry illustrative arrays, for a typical clear day in June at latitude 32°. The improvement in performance is apparent; on less than clear days the Espy Geometry improvement is even more significant as is evident by comparing the two systems at early morning and late evening hours. FIGS. 8 and 9 illustrate energy rates, and FIG. 10 shows the integral of these performance rates under the same parameters used in compiling FIGS. 8 and 9. Again, the increased effectiveness is obvious from the graphs.

Figure 11:
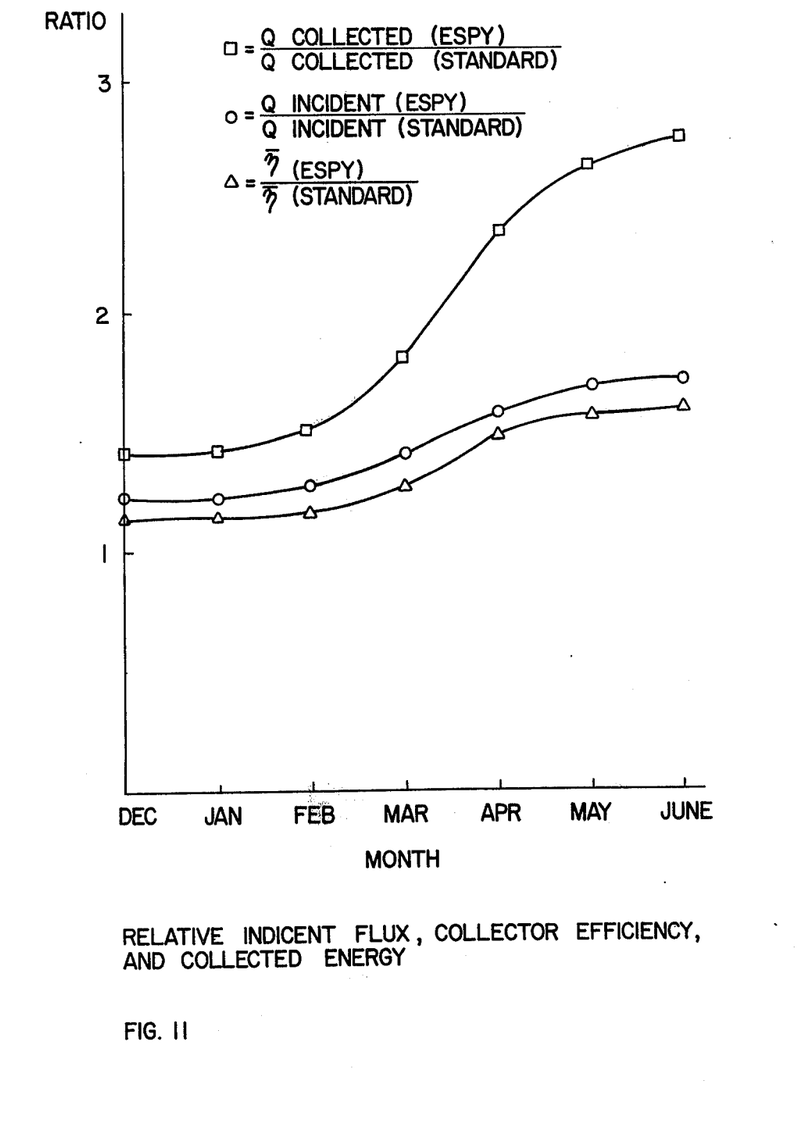
FIG. 11 is a comparative ratio graph of relative incident flux, collector efficiency, and collected energy for Standard and Espy. Geometry at latitude 32°.
Figure 12:
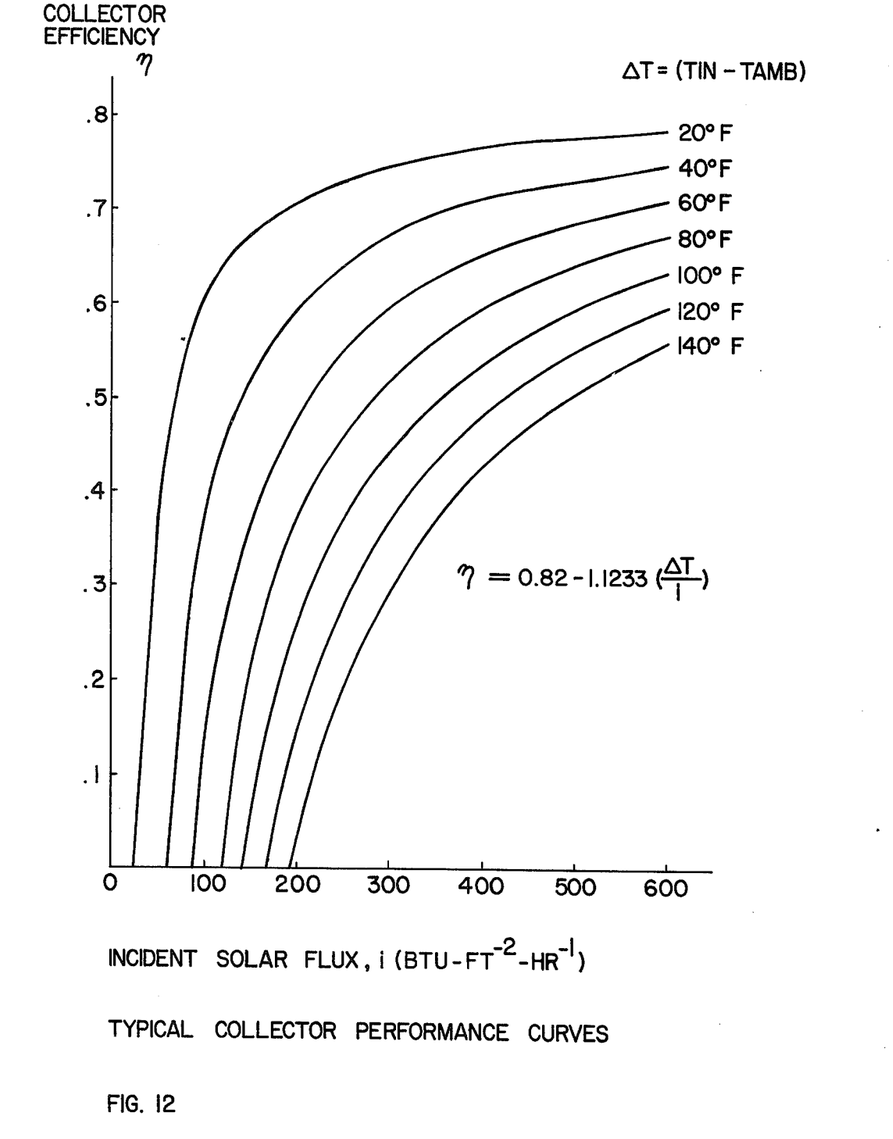
FIG. 12 is a graph of a family of collector performance curves, taken from a formula derived from values perviously known in the art.

A summary of the above described graphs is shown in FIG. 11. Ratios of relative incident flux, collector efficiency, and total collected energy for the compared systems are shown. This represents total usable improvement by virtue of changing from Standard Geometry to Espy Geometry. FIG. 12, a graph of a family of collector performance curves taken from the same efficiency formula previously described, effectively illustrates the dramatic effect of an increase in incident flux. For a ΔT of 140° F and solar flux incidence of 200 Btu/hr/ft$^2$, a collector has nearly zero efficiency; with a flux concentration ratio of 1.5, the solar flux goes to 300 Btu/hr/ft$^2$ and efficiency of the collector goes to almost 30%. Usually lower rates of improvement in collector efficiency take place when ΔT is less than 140° F and the flux concentration increases.

The invention just described is particularly suitable for use in latitudes where air conditioning, refrigeration, or space cooling is the primary load on the solar radiation conversion system. It is of course, also useful for heating loads, but its improvement over prior art may not be as significant in that application. The selection of specific reflector and collector hardware for comparison is not material; however, it is obvious that with the improved geometry, less efficient and less costly reflector-collector hardware can be selected for use in the Espy Geometry to obtain system performance for absorption cycle cooling at costs lower than that required in the prior art. It is apparent that standard available materials can be used with the Espy Geometry, not requiring complex curvatures for reflectors, or exotic collection devices. Another aspect of this invention is its particular suitability for modular construction and installation. The design leads itself to construction of integral reflector-collector assemblies of unitized construction. For each latitude of use panels of standard reflector and collectors may be constructed, in nominal lengths, for application in any requirement.

Having thus described my invention in general, and having illustrated embodiments which are not meant to limit the scope of the claims therefor, What I claim is:

1. An improved non-tracking and concentrating solar radiation conversion system for collecting diffuse and beam solar radiation directly and by reflection comprising:

a. at least one planar solar radiation collector of substantially elongated rectangular dimensions;

b. said collector having long axes arrayed in an approximate east-west direction with planar surfaces tilted downwardly toward the equator at an angle from the horizontal approximately equal to the latitude of the array plus 23.5°;

c. a reflector system having one reflector aperture of substantially elongated rectangular dimensions for each of said collectors;

d. said reflector apertures having long axes parallel with the long axes of said solar radiation collectors with aperture planes tilted downwardly from the equator at an angle from the horizontal equal to 66.5° minus the latitude of the array;

e. said reflector apertures being alternately spaced in a north-south direction with said solar radiation collectors;

f. the upper edge of each of said reflector apertures being joined with the upper end of the adjacent solar radiation collector and the lower edges of each of said reflector apertures being joined with the lower edges of the next adjacent solar radiation collector;

g. said reflector apertures comprising at least one planar reflector facet having a highly light reflective surface sufficient to reflect all noon-time sun rays incident upon the reflector aperture to said solar radiation collector.

2. The invention of claim 1 for use at latitude of 19.5° and less wherein said reflector aperture comprises one planar reflector facet lying in the plane of the reflector aperture.

3. The invention of claim 1 wherein each adjacent pair of reflectors and collectors is manufactured as an integral unit suitable for use in unitized modular application.

4. An improved non-tracking and concentrating solar radiation conversion system for use at latitudes from 19.5° to 30° for collecting diffuse and beam solar radiation directly and by reflection comprising:

a. at least one planar solar radiation collector of substantially elongated rectangular dimensions;

b. said collector having its long axis arrayed in an approximate east-west direction with planar surfaces tilted downwardly toward the equator at an angle from the horizontal approximately equal to the latitude of the array plus 23.5°;

c. a reflector system having one reflector aperture of substantially elongated rectangular dimensions for each of said collectors;

d. each of said reflector apertures having its long axis parallel with the long axis of said solar radiation collector with aperture planes tilted downwardly from the equator at an angle from the horizontal equal to 66.5° minus the latitude of the array;

e. each of said reflector apertures being alternately spaced in a north-south direction with said solar radiation collectors;

f. the upper edge of each of said reflector apertures being joined with the upper end of the adjacent solar radiation collector and the lower edges of each of said reflector apertures being joined with the lower edges of the next adjacent solar radiation collector;

g. each of said reflector apertures comprising upper and lower planar reflector facets of equal width, said reflector facets having a highly light reflective surface sufficient to reflect all noon-time sun rays incident upon the reflector aperture to said solar radiation collector, the upper edge of the upper facet being the same as the upper edge of the reflector aperture, the lower edge of the lower facet being the same as the lower edge of the reflector aperture, each facet being tilted toward the equator and from the plane of the reflector aperture at an angle equal in value to the latitude of the array divided by two, minus 9.75°, the inner edges of the facets being joined.

5. An improved non-tracking and concentrating solar radiation conversion system for use at latitudes between 30° to 32.5° for collecting diffuse and beam solar radiation directly and by reflection comprising:
  a. at least one planar solar radiation collector of substantially elongated rectangular dimensions;
  b. said collector having its long axis arrayed in an approximate east-west direction with planar surfaces tilted downwardly toward the equator at an angle from the horizontal approximately equal to the latitude of the array plus 23.5°;
  c. a reflector system having one reflector aperture of substantially elongated rectangular dimensions for each of said collectors;
  d. each of said reflector apertures having its long axis parallel with the long axis of said solar radiation collector with aperture planes tilted downwardly from the equator at an angle from the horizontal equal to 66.5° minus the latitude of the array;
  e. each of said reflector apertures being alternately spaced in a north-south direction with said solar radiation collectors;
  f. the upper edge of each of said reflector apertures being joined with the upper end of the adjacent solar radiation collector and the lower edges of each of said reflector apertures being joined with the lower edges of the next adjacent solar radiation collector;
  g. each of said reflector apertures comprising upper, middle and lower planar reflector facets having a highly light reflective surface sufficient to reflect all noon-time rays incident upon the reflector aperture to said solar radiation collector, the upper facet having a projection on the reflector aperture of 35% of the width of said aperture, the upper edge of said facet being the upper edge of the reflector aperture and tilted away from the reflector aperture towards the equator at an angle equal in value to the latitude of the array divided by two, minus 9.75°; the lower facet having a projection on the reflector aperture of 35% of the width of said aperture, the lower edge of said facet being the lower edge of the reflector aperture and tilted away from the reflector aperture towards the equator at an angle equal in value to the latitude of the array divided by two, minus 9.75°; the middle reflector facet having a projection on the reflector aperture of 30% of the width of said aperture, and said middle facet being parallel in plane to the said reflector aperture, its upper edge being the lower edge of the upper facet, its lower edge being the upper edge of the lower facet.

6. An improved non-tracking and concentrating solar radiation conversion system for use at latitudes above 32.5° for collecting diffuse and beam solar radiation directly and by reflection comprising:
  a. at least one planar solar radiation collector of substantially elongated rectangular dimensions;
  b. said collector having its long axis arrayed in an approximate east-west direction with planar surfaces tilted downwardly toward the equator at an angle from the horizontal approximately equal to the latitude of the array plus 23.5°;
  c. a reflector system having one reflector aperture of substantially elongated rectangular dimensions for each of said collectors;
  d. each of said reflector apertures having its long axis parallel with the long axis of said solar radiation collector with aperture planes tilted downwardly from the equator at an angle from the horizontal equal to 66.5° minus the latitude of the array;
  e. each of said reflector apertures being alternately spaced in a north-south direction with said solar radiation collectors;
  f. the upper edge of each of said reflector apertures being joined with the upper end of the adjacent solar radiation collector and the lower edges of each of said reflector apertures being joined with the lower edges of the next adjacent solar radiation collector;
  g. each of said reflector apertures comprising upper, middle and lower planar reflector facets having a highly light reflective surface sufficient to reflect all noon-time sun rays incident upon the reflector aperture to said solar radiation collector, the upper facet having a projection on the reflector aperture of 35% of the width of said aperture, the upper edge of said facet being the upper edge of the reflector aperture and tilted away from the reflector aperture towards the equator at an angle equal in value to the latitude of the array divided by two, minus 9.75°; the lower facet having a projection on the reflector aperture of 35% of the width of said aperture, the lower edge of said facet being the lower edge of the reflector aperture and tilted away from the reflector aperture towards the equator at an angle equal in value to the latitude of the array divided by two, minus 9.75°; the middle reflector facet having a projection on the reflector aperture of 30% of the width of said aperture, and said middle facet being parallel in plane to the said reflector aperture, its upper edge being the lower edge of the upper facet, its lower edge being the upper edge of the lower facet;
said calculated angles being measured from an assumed artificial horizontal plane, and wherein the assumed artificial horizontal plane of the entire array is tilted upwardly away from the equator from the true horizontal plane at the latitude of the array by an angular value equal to the latitude of the array minus 32.5°.

* * * * *